W. H. SMITH.
TIRE HEATING FURNACE.
APPLICATION FILED MAR. 6, 1918.

1,283,941.

Patented Nov. 5, 1918.

Inventor
William H. Smith

By
Attorney

UNITED STATES PATENT OFFICE.

WILLIAM H. SMITH, OF FAYETTE, ALABAMA.

TIRE-HEATING FURNACE.

1,283,941.     Specification of Letters Patent.     Patented Nov. 5, 1918.

Application filed March 6, 1918. Serial No. 220,780.

*To all whom it may concern:*

Be it known that I, WILLIAM H. SMITH, a citizen of the United States of America, residing at Fayette, in the county of Fayette and State of Alabama, have invented certain new and useful Improvements in Tire-Heating Furnaces, of which the following is a specification.

This invention relates to a furnace for heating metallic tires and like annular bodies, and consists in the provision of an annular heating chamber adapted to be filled with coke, charcoal or the like, and having a central air duct communicating by radial branches with nozzles entering through the inner and outer side walls of the chamber at opposite points so that the air will be blown into the heating chamber on both sides of the tire which is so supported as to deflect and distribute the air laterally so as to produce a substantially uniform heat throughout the entire chamber.

In its preferred form the nozzles are arranged in pairs, one in the inner and one in the outer wall, and each pair is supplied by a common radial air blast pipe leading from a common distribution duct into which air is forced by any suitable means.

My invention will be better understood by reference to the accompanying drawings which illustrate its preferred embodiment, and in which:—

Similar reference numerals refer to similar parts throughout the drawings.

Figure 1:
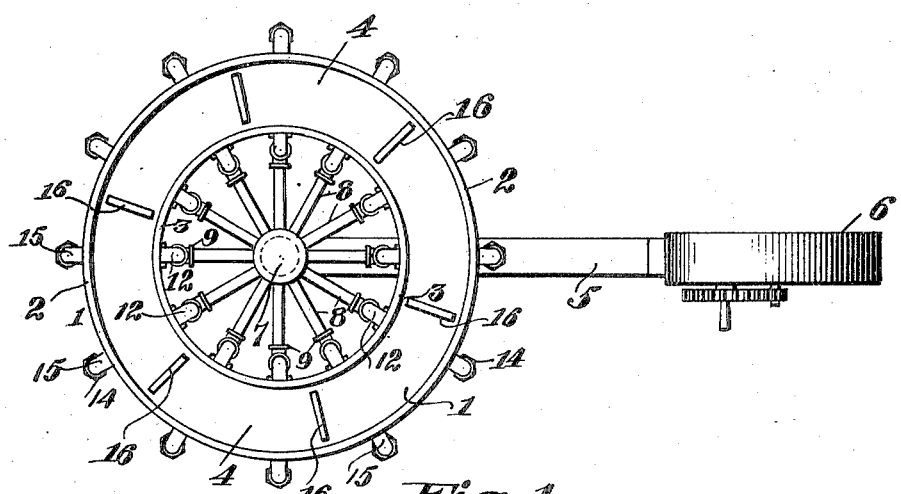
Figure 1 is a plan view of the apparatus.
Figure 2:
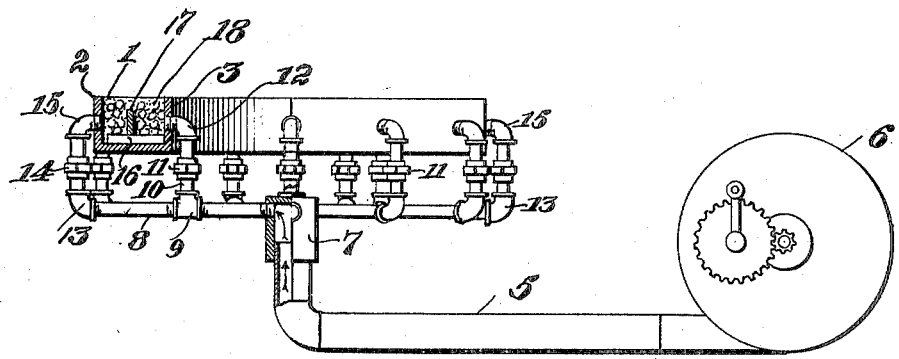
Fig. 2 is a side view in quarter section.

The furnace comprises an annular heating chamber 1 inclosed between the outer peripheral wall 2 and the inner peripheral wall 3 which are suitably connected to or formed integral with the annular bottom 4. An air duct 5 is provided to which air under pressure is supplied by a blower 6 and delivered to a distributing header 7 from which a series of radial distribution pipes 8 lead. Each distribution pipe is provided with a T-coupling 9 to which a vertical blower pipe 10 is connected, this pipe being in turn connected by a union 11 to an inner blowing nozzle 12 having a right angled bend and having its discharge end inserted through an opening in the inner wall 3 at a distance slightly above the bottom of the heating chamber. At the outer end of the pipe 8 I provide an elbow 13 which is connected by means of a union 14 with an outer blowing nozzle 15 having a right angled bend so that its discharge end can be inserted through the outer wall 2 at a point opposite the nozzle 12. The distributing pipes 8 with their nozzle arrangements as described are arranged substantially equi-distantly about the whole furnace, with the nozzles spaced approximately one foot apart. A plurality of tire supporting ribs 16 are raised about one inch above the bottom.

In operation, a tire 17 is placed on the ribs 16 in the bottom of the heating chamber 1 and stands opposite and between the opposing rows of nozzles 12 and 15, and then coke or charcoal 18 is filled in about the tire and the fire started, after which the air blast is forced in through the two sides of the nozzles and is distributed circumferentially of the chamber by the tire itself so that a uniform combustion takes place which enables me to heat a tire in about three minutes as compared with the tedious process necessary with other annular tire heaters on the market.

This invention is not intended to be restricted in scope to the specific embodiment shown, but contemplates such modifications as come within the spirit and scope of the claim.

Having thus described my invention, what I claim as new and desire to secure by Letters Patent, is:—

In a tire heater, an annular chamber closed at its bottom and having a plurality of pairs of oppositely disposed air blast nozzles opening through its inner and outer side walls, each opposite pair of nozzles having a common radial supply pipe, a centrally arranged duct for supplying air to said supply pipes which are distributed equi-distantly about the heating chamber, raised ribs in the chamber to support the tire above the bottom and between the opposing series of nozzles, and means to deliver an air blast to the air duct, substantially as described.

In testimony whereof I affix my signature.

WILLIAM H. SMITH.

Witness:
   NOMIE WELSH.

Copies of this patent may be obtained for five cents each, by addressing the "Commissioner of Patents, Washington, D. C."